(No Model.)

W. E. EVERITT.
MACHINE FOR SPREADING PLASTER, PARIS GREEN, &c.

No. 538,483. Patented Apr. 30, 1895.

Witnesses.

Walter E. Everitt Inventor.
By James Sangster
Attorney.

UNITED STATES PATENT OFFICE.

WALTER E. EVERITT, OF BUFFALO, NEW YORK.

MACHINE FOR SPREADING PLASTER, PARIS-GREEN, &c.

SPECIFICATION forming part of Letters Patent No. 538,483, dated April 30, 1895.

Application filed November 8, 1894. Serial No. 528,263. (No model.)

*To all whom it may concern:*

Be it known that I, WALTER E. EVERITT, a citizen of the United States, residing in Buffalo, in the county of Erie and State of New York, have invented certain new and useful Improvements in Machines for Spreading Plaster, Paris-Green, or other Material, of which the following is a specification.

My invention relates to a new and improved means for spreading plaster, paris green, or other material, for fertilizing, killing potato bugs or other insects, or for other purposes where a device of that kind may be required, and it will be fully and clearly hereinafter described and claimed, reference being had to the accompanying drawings, in which—

Figure 1:
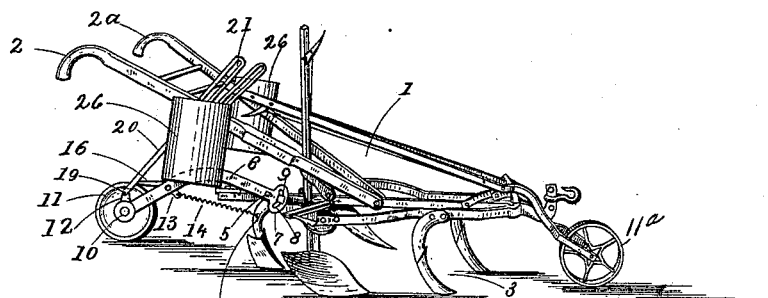
Figure 2:
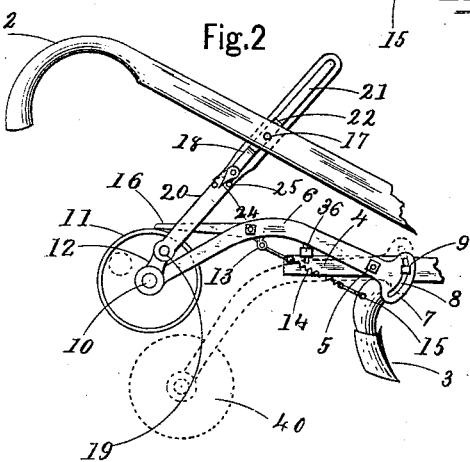
Figure 3:
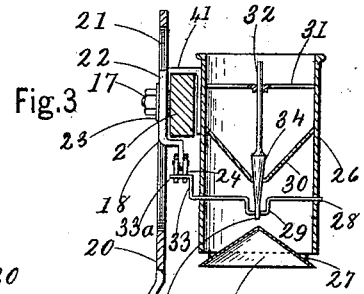
Figure 4:
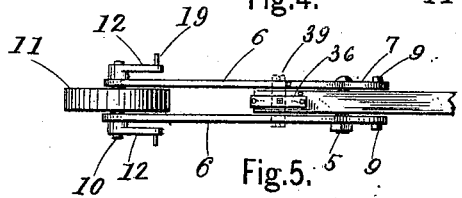
Figure 5:
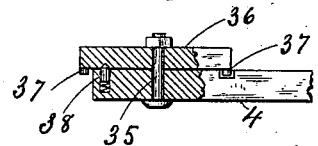

Figure 1 represents a perspective view of a cultivator, showing my improved device connected thereto. Fig. 2 represents a side elevation of the rear portion of the device, showing the crank-wheel and its connecting mechanism for operating the same. Fig. 3 is a rear view of a portion of the mechanism, showing a vertical central cross-section through the vessel for holding the material to be distributed. Fig. 4 represents a top view of a part of the frame portion for holding the crank-wheel, also the means for holding the frame and crank-wheel up when required. Fig. 5 is a detached side elevation of the pivoted device, partly in section, for holding the crank-wheel down, all of which will be more clearly described farther on, reference being had to the drawings in detail.

In illustrating my invention I have shown it connected with a cultivator, 1 representing the ordinary frame of a cultivator, 2 and 2ª, the handles and 3, the usual cultivator teeth. At the rear of the cultivator is an extension 4, which extension when the invention is applied to an ordinary cultivator, is made separate and rigidly secured to the rear portion of the frame of the cultivator but the extension portion 4 may be made in one piece with the central beam. On the extension piece 4, is pivoted by a bolt 5, the two angular frame pieces 6, so as to swing easily thereon. At the front ends of these two frame pieces is an enlarged portion 7, each having a curved slot or opening 8, forming a portion of a circle of which the center is the pivot bolt 5. Through each of the openings 8, is passed a set screw 9, by which the frame 6, can be rigidly secured to the cultivator frame at any point to which it may be adjusted on the pivot bolt 5. At the rear end of the frame bars 6, is mounted a short shaft 10, adapted to turn easily in said frame and between the two frame bars is rigidly secured on said shaft a wheel 11. At each outer end of the shaft 10, is secured, by a key or other well known means, a crank arm 12. To the pivoted frame 6, is fastened at or about the point 13, a spring 14, having its opposite end secured either to the extension portion 4, or some convenient part of the rear of the cultivator, the point 15 (see Fig. 1) for instance.

In Figs. 1 and 2, I have shown a pivoted scraper 16, having its free end resting upon the wheel 11, for the purpose of cleaning off the mud and dirt that may gather on it during the operation of the machine. In this instance I have shown the point 13, to which the spring 14, is secured, at the rear end of the scraper 16. This construction not only draws or keeps the wheel 11, downward with a yielding force but it also draws the free end of said scraper with a yielding force down against the face of the wheel 11, for the purposes above mentioned. To one or both handles 2 or 2ª, is pivoted by a bolt 17, a short angular arm 18, so it can swing easily on the bolt 17. Each crank 12, is connected by a pin 19, with an arm 20. The upper parts of these arms are provided with a slot or long narrow opening 21, which fits over the narrow straight portion 22, of the arm 18, (see Figs. 2 and 3) so that the arm 20, can slide easily when moved up or down thereon. A washer 23, on the bolt 17, keeps the arms 20, in place up to the arms 2 and 2ª. On the lower end of the arm 18, is pivoted a pawl 24. A pin 25 on said arm 18, limits the movement of the pawl 24, downward, see Fig. 2, where this is shown. The office of this pawl 24, will appear farther on.

26, represents the distributing vessel. I have shown it in a cylindrical form but it may be square if desired.

At the bottom of the distributing vessel is a cone shaped sieve 26ª, made either of wire gauze or finely perforated sheet metal. It is secured to the vessel by the small holding pieces 27.

A crank shaft 28, is mounted in the distributing vessel, substantially as shown in Fig. 3. It is provided on the inside with a double crank 29, and the inside of the vessel is provided with a conical bottom 30, and with a cross-bar 31 near the top. The cross bar, 31, and cone shaped bottom are both perforated in a line with each other and a plunger bar 32, mounted therein and having its lower end pivoted to the crank 29, at the point 29ª, substantially as shown in said Fig. 3. On the outside of the crank shaft 28, is a crank arm 33, the portion 33ª, of which, as the arm 20 swings back and forth while the machine is in operation, lies directly in the path of the point of the pawl 24, as will more clearly hereinafter appear. The plunger bar 32, is provided with a cone shaped enlargement 34 at the bottom, so that when the plunger is down it closes the opening and when raised up the smaller portion leaves opening enough around it to allow the plaster, or other equivalent material or liquid, to drop out.

On the top of the extension piece 4, is pivoted centrally by a bolt 35, see Figs. 4 and 5, a short piece of iron 36, having two downward projecting portions 37, one at each end, and in the extension piece 4, is a spring bolt 38. See Fig. 5. This piece 36, can be turned at right angles as shown by the dotted lines 39, in Fig. 4, and when turned to the position shown in Fig. 5, the bolt 38, springs up into a depression and holds it so it cannot be easily shaken out of place. The object of this pivoted piece, is that when the wheel 11, is dropped down into the position shown in Fig. 2, by the dotted lines 40, it can be easily turned by the foot into the position shown by the dotted lines 39, in Fig. 4, and thereby hold the wheel 11, downward which operation lifts the cultivator teeth from the ground so that the machine is supported on the front wheel 11ª, and rear wheel 11, and can thus be easily moved from one point to another when the teeth are out of the ground and are not working.

I do not wish to confine myself to the exact construction of the distributing vessel as the valve 34, may be constructed in any well known way to hold liquid or powder, and the crank 33 may be made to operate any well known means for distributing plaster or other powdered material. The can or vessel 26, is preferably made of sheet tin or iron, and is hung on the handle of the cultivator by means of a hook portion 41.

The operation will be readily understood from the foregoing description and drawings.

I claim as my invention.—

1. In a cultivator, the combination with a front wheel mounted on stationary bearings, of a rear wheel supported on a double frame and pivoted to the main frame so that the wheel can be raised or lowered and means for securing said wheel in either position consisting of a cross bar pivoted to the rear of the main frame and between the pivoted bars carrying the wheel, substantially as described.

2. In a cultivator, the combination with a distributing vessel for carrying the material to be distributed and means for distributing said material, of a wheel mounted on the rear of the machine, a slotted arm having one end connected with a crank on said wheel and the other end connected with an arm pivoted on the handle and carrying a pawl for actuating the mechanism in the distributing vessel, substantially as described.

3. In a cultivator, the combination with the front wheel mounted on stationary bearings, of a vertically adjustable wheel mounted on a pivoted frame at the rear of the machine adapted to either regulate itself to the inequalities of the ground over which it passes or be secured in a raised or lowered position by means of a cross-bar pivoted to the rear of the main frame, said cross-bar being adapted to rest lengthwise on the top of the rear frame or be turned at right angles thereto under or above the double supporting frame, substantially as and for the purposes described.

4. In a cultivator the combination with the supporting frame of an angular frame pivoted thereto, a roller mounted on a shaft at the rear end of said angular frame crank arms mounted on said shaft, slotted arms connecting the cranks with the cultivator handles, pawl arms pivoted to the cultivator handles adapted to fit in the slots in the slotted arms so said arms can slide up or down thereon, and pawls pivoted to the lower portions of the pawl arms, for opening the distributing mechanism substantially as described.

5. In a cultivator, the combination with the distributing vessel and means for connecting it with the cultivator handle, of a conical perforated spreader secured by holding pieces slightly below the bottom, a tapering bottom on the inner side located above the perforated spreader for holding the material to be distributed and having a valve opening and seat at the bottom, a valve having its stem secured by a cross bar adapted to fit said valve seat, a crank shaft mounted in the lower part of the distributing vessel having its crank-pin pivotally connected with the lower end of the valve, a crank arm on one end of the crank shaft extending in a substantially horizontal direction outside of the distributing vessel, and means substantially as above described for operating the same, for the purposes set forth.

6. In a cultivator, the combination with a supporting frame composed of two angular frame bars, an extension piece rigidly secured to the rear of the machine frame, means for securing the frame bars on the sides of the extension piece so as to be capable of a vertical up or down movement, a wheel mounted on a shaft at the rear end of the frame bars and means substantially as described for securing the wheel either in a lowered or raised position as set forth.

7. In a cultivator, a means for spreading plaster, paris green, &c., consisting of angular frame pieces pivoted to an extension portion, a wheel mounted between the rear ends of the frame pieces on a shaft provided with a crank and mechanism substantially as above described, connected with said crank arm for operating a plunger valve in the distributing vessel, and a cross bar centrally pivoted to the extension portion, whereby the cultivator may be used either alone or with the distributing vessel, substantially as described.

8. In a cultivator, means for spreading plaster, paris green, &c., consisting of a frame portion pivoted to an extension portion at the rear of the machine, a wheel rigidly secured to a shaft mounted at the rear of the pivoted frame, a crank firmly secured to said shaft, a connecting rod having its lower end pivoted to the crank arm, and its upper portion provided with a slot or slideway, a slideway bar adapted to fit said slideway and pivoted to the cultivator handle and carrying a pivoted pawl at its lower end, means for keeping the connecting rod to the cultivator handle while allowing it to oscillate or move up or down thereon, for operating the mechanism in the distributing vessel, substantially as described.

9. In a machine for spreading plaster, the combination with the frame of the machine of a frame pivoted at the rear of the machine, a wheel rigidly secured to a shaft mounted on the free end of the pivoted frame, a crank arm secured to said shaft and pivoted to a slotted connecting arm, a slideway bar pivoted to the cultivator handle adapted to fit in the slotted portion of the connecting arm, a pawl pivoted to the slideway bar, a distributing vessel secured to the cultivator frame and provided with a crank connected with a plunger valve and an outside crank having a crank-pin located in the pathway of the pawl, as and for the purposes described.

WALTER E. EVERITT.

Witnesses:
JAMES SANGSTER,
H. C. HERR.